United States Patent Office 2,770,167
Patented Nov. 13, 1956

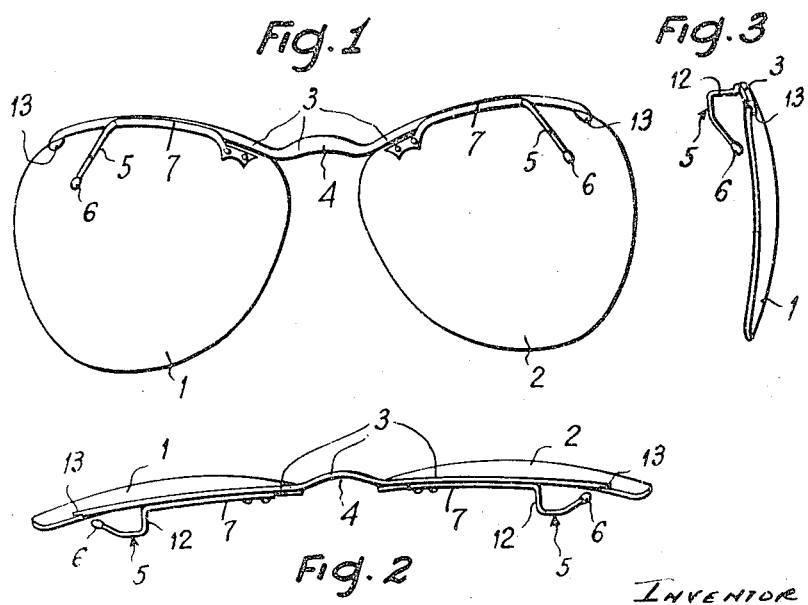

2,770,167

CLIP-ON SUNGLASSES

Robert Passet, Vincennes, France, assignor to Georges Lissac, Paris, France

Application August 13, 1952, Serial No. 304,070

Claims priority, application France August 20, 1951

2 Claims. (Cl. 88—41)

This invention relates to sunglasses or other auxiliary glasses of the clip-on type removably attachable over a pair of ophthalmic or other spectacles, as described for example in my Letters Patent No. 2,602,372, dated July 8, 1952. In this prior application a device of this type was described essentially comprising a pair of glasses or similar optical elements, with or without rims, secured in depending relationship from an upper mounting bar or bridge member, and having a pair of engaging elements or hooks projecting therefrom for engagement with a pair of spectacles over which the device is adapted to be detachably fitted. The upper mounting member is provided with a longitudinal camber so that, when the device is applied over the spectacles, said member may be resiliently deformed and the engaging elements may be engaged over the spectacles to removably secure the sunglasses to the latter.

It is an object of the present invention to improve the stability of the assembly between the spectacles and the sunglasses.

In the arrangement described in my Letters Patent No. 2,602,372, the engaging elements or hooks were mounted adjacent to the central portion of the sunglasses, or in other words adjacent to, and to either side of, the wearer's nose. As a consequence a comparatively slight external force was sufficient to displace the sunglasses with respect to the spectacles as the result of a movement of relative rotation therebetween about an axis passing substantially through the centre of symmetry of the assembly and normal to the general plane thereof, so that, for example, the left side of the screen would be shifted up and the right side would be shifted down while the spectacles remained normally positioned on the wearer's face. If, with the purpose of increasing the resistance to such relative displacement, it is attempted in the arrangement of the said patent to increase the spacing between the engaging elements, so that the torque required to be exerted to produce such relative rotation will be increased, it is found that the mounting member or cross bar, the resilient deformation of which, as above stated, is relied upon to hold the sunglasses and the spectacles in assembled condition, does not exert a sufficient retaining force thereon and the two appliances then tend to separate of their own accord. Another object of this invention, therefore, is to provide a pair of sunglasses of the general type described in my aforementioned Letters Patent, in which the securing elements are spaced a comparatively greater distance apart so that improved stability is imparted against relative shifting of the assembly, and wherein nevertheless the sunglasses and the spectacles are positively retained in their removably assembled condition and do not tend to become separated from each other.

According to the invention, in a sunglass or other auxiliary spectacle device of the type described in my Letters Patent No. 2,602,372, the engaging or locking elements are arranged a comparatively wide distance apart and preferably adjacent to the laterally outward ends of the device, and a resilient deformation is imparted to said elements so that they will develop an additional resilient retaining force tending to maintain the device in assembly with the spectacles, instead of or in addition to the retaining force developed by the main mounting bar or bridge member.

The above and further objects and features of the invention will appear more fully as the description proceeds.

In the accompanying drawings, given by way of illustration and not of limitation, Figs. 1 and 2 are, respectively, a rear elevation and a plan view of a spectacle screen or shield device according to one embodiment of the present invention; and Fig. 3 is a side view of Fig. 1.

As already mentioned, the present invention contemplates providing improved stability to the sunglasses with respect to the spectacles to which they are adapted to be removably affixed, and for this purpose the invention contemplates increasing the spacing between the engaging elements or hooks 5 to either side of the vertical center plane of symmetry of the sunglasses. Such increase in spacing will necessarily reduce the spring force exerted by the upper bridge member 3 upon the hook elements 5. I have found, according to the present invention, that this disadvantage can be overcome and a particularly stable and generally desirable pair of sunglasses produced, by so arranging the elements 5 that they will develop an additional resilient force effective to compensate for the said reduction in tension and to ensure the requisite stability of the sunglasses with respect to the spectacles.

In the embodiment shown in Figs. 1, 2 and 3, the improved sunglasses comprises a pair of lenses or similar optical elements 1 and 2 supported from metallic lens securing means or strips 7 extending alongside of, and soldered or otherwise secured to, the lateral portions of a mounting cross member 3 having a nose rest or bridge portion 4 intermediate the elements 1, 2.

The lenses 1 and 2 are secured (e. g. pinned or riveted) to the strips or wires 7 at the inwardly directed ends of the latter, while engaging elements or hooks generally indicated at 5 serving to retain and apply the sunglasses against the spectacles are formed on the outward ends of said strips or wires. In the embodiment illustrated the hooks 5 are formed integrally with the lens securing wires 7. The outer ends of said strips or wires are bent in the manner clearly shown in Figs. 2 and 3 so as to form an offset as at 12 whereby the sunglasses may be fitted to spectacle rims of increased thickness (such as horn, tortoise-shell, punched and moulded plastics, etc.). The offset portions 12 are extended rearwardly and then angularly downwards, and then towards the rear surface of the lenses 1 and 2 and terminate each in a knob 6 adjacent said surface. Each of these hook portions is so conformed that its knob 6 will resiliently engage the rear face of the spectacles over which the sunglasses of the invention are to be fitted.

Since the lenses 1 and 2 are secured to the supporting strips 7 adjacent the inner ends of the strips, as previously stated (whereby the outer portions of the screen are free), means are preferably provided for retaining the free outer portions of the lenses 1, 2. For this purpose, the mounting bar 3 is extended outwards with a curvature corresponding to that of the top peripheral edge of the elements and the extreme ends of the branches of the bar 3 are formed with small flat surfaces 13 adapted to abut with the front surfaces of the lenses 1, 2 adjacent the tops thereof. During the resilient deformation of the mounting bar as the sunglasses are fitted to a pair of spectacles, the lenses 1, 2 are pressed against the flats 13 of the mounting bar and the stability of the assembly is thus improved.

While the securing hook elements 5 have been described as forming integral parts of the strips or wires to which the lenses 1, 2 are attached, this is obviously not essential, and the hook elements 5 may, for example, form integral parts of or may be rigidly connected to the branches of the mounting bar 3. Other modifications may be made in the structural details described and illustrated within the scope of the claims.

What I claim is:

1. A pair of clip-on sunglasses comprising a resilient upper mounting member of generally arcuate shape, a pair of lenses affixed to said upper mounting member substantially along the arc of said upper mounting member, said lenses extending beyond the outer ends respectively of said upper mounting member, an abutment formed on each end of said upper mounting member, said abutments extending over a portion of the outer surface of said lenses, and a pair of resilient clamping members affixed each to said upper mounting member adjacent an end thereof, said clamping members extending from said upper mounting member on the concave side of said arc, downwardly in a direction generally parallel to said lenses, and toward said lenses.

2. A pair of sunglasses adapted to be removably affixed over a pair of spectacles, said sunglasses comprising a resiliently flexible mounting cross member, a pair of lens elements, means securing said lens elements to said flexible mounting member in depending relation therefrom, and a pair of engaging elements projecting from said mounting member and engageable over the rear face of said spectacles adjacent to the laterally outer ends of the latter, said engaging elements comprising a pair of resilient strip-like parts each deformed to have a portion directed away from said lens elements and at least one further portion directed towards said lens elements to yieldingly apply said sunglasses against said spectacles when said engaging elements are engaged over said spectacles, said cross member having formed at each end thereof an abutting surface extending substantially parallel to the plane of the adjacent one of said lens elements, said abutting surfaces being adapted each to engage with the front surface of the said adjacent lens element when said engaging elements are engaged over said spectacles.

References Cited in the file of this patent

UNITED STATES PATENTS

| | | |
|---|---|---|
| 1,709,195 | Shindel | Apr. 16, 1929 |
| 2,574,749 | Mendelsohn | Nov. 13, 1951 |
| 2,602,372 | Passet | July 8, 1952 |

FOREIGN PATENTS

| | | |
|---|---|---|
| 675,812 | France | Nov. 8, 1929 |
| 638,428 | Great Britain | June 7, 1950 |